US012585055B2

(12) United States Patent
Bacon-Brown

(10) Patent No.: US 12,585,055 B2
(45) Date of Patent: Mar. 24, 2026

(54) MULTILAYER GRID WAVEPLATE

(71) Applicant: Moxtek, Inc., Orem, UT (US)

(72) Inventor: Daniel Bacon-Brown, Orem, UT (US)

(73) Assignee: Moxtek, Inc., Orem, UT (US)

( * ) Notice: Subject to any disclaimer, the term of this patent is extended or adjusted under 35 U.S.C. 154(b) by 996 days.

(21) Appl. No.: 17/523,182

(22) Filed: Nov. 10, 2021

(65) Prior Publication Data

US 2022/0179145 A1      Jun. 9, 2022

Related U.S. Application Data

(60) Provisional application No. 63/122,581, filed on Dec. 8, 2020.

(51) Int. Cl.
G02B 5/30          (2006.01)

(52) U.S. Cl.
CPC ......... G02B 5/3058 (2013.01); G02B 5/3041 (2013.01)

(58) Field of Classification Search
CPC ............................ G02B 5/3058; G02B 5/3041
See application file for complete search history.

(56) References Cited

U.S. PATENT DOCUMENTS

| | | | | |
|---|---|---|---|---|
| 6,447,120 B2 * | 9/2002 | Hansen | .................. | G03B 21/14 |
| | | | | 359/489.08 |
| 2008/0055719 A1 * | 3/2008 | Perkins | ................ | G02B 5/3058 |
| | | | | 359/485.05 |
| 2010/0265571 A1 * | 10/2010 | Wang | .................. | G02B 5/1857 |
| | | | | 359/485.05 |
| 2014/0313571 A1 * | 10/2014 | Gardner | .............. | G02B 5/3075 |
| | | | | 359/352 |

(Continued)

FOREIGN PATENT DOCUMENTS

KR          20130118790 A   * 10/2013

*Primary Examiner* — George G. King
*Assistant Examiner* — K Muhammad
(74) *Attorney, Agent, or Firm* — Thorpe North & Western, LLP

(57) ABSTRACT

The waveplates herein (A) can have high performance across a broad wavelength range and broad range of incident angles; (B) can be thin; and (C) can withstand a high temperature. The waveplates can include ribs 12 on a substrate 11 with a channel 13 between each pair of adjacent ribs 12. Each rib 12 can include the following layers in the following order moving outward from the substrate: a bottom-medium-layer BM ($n_{BM}$), a high-layer H ($n_H$), then a top-medium-layer TM ($n_{TM}$). Each rib 12 can be located on a bottom-low-layer BL ($n_{BL}$). A top-low-layer TL ($n_{TL}$) can be located on a face $TM_F$ of the top-medium-layer TM farthest from the substrate 11. Relationships between indices of refraction of these layers can be $n_{BL}<n_{BM}<n_H$ and $n_{TM}<n_{TM}<n_H$.

20 Claims, 4 Drawing Sheets

(56)     References Cited

U.S. PATENT DOCUMENTS

2014/0346574  A1*  11/2014  Cai  .................... H01L 27/0886
                                                      257/288
2015/0085354  A1*   3/2015  Tatemura  ................ G02B 5/26
                                                      359/359
2020/0271838  A1    8/2020  Gao et al.

* cited by examiner

MULTILAYER GRID WAVEPLATE

CLAIM OF PRIORITY

This application claims priority to U.S. Provisional Patent Application No. 63/122,581, filed on Dec. 8, 2020, which is incorporated herein by reference.

FIELD OF THE INVENTION

The present application is related generally to optical waveplates.

BACKGROUND

Waveplates retard one polarization with respect to a perpendicular polarization. Two common types of waveplates are half-wave and quarter-wave.

A half-waveplate can create a $\pi$ phase delay between two polarization states. A half-waveplate can rotate linear polarization.

A quarter-waveplate can create a $\pi/2$ phase delay between two polarization states. A quarter-waveplate can convert linearly polarized light into elliptical or circularly polarized light. A quarter-waveplate can also convert circularly polarized light into linearly polarized light.

BRIEF DESCRIPTION OF THE DRAWINGS (DRAWINGS MIGHT NOT BE DRAWN TO SCALE)

Figure 1:
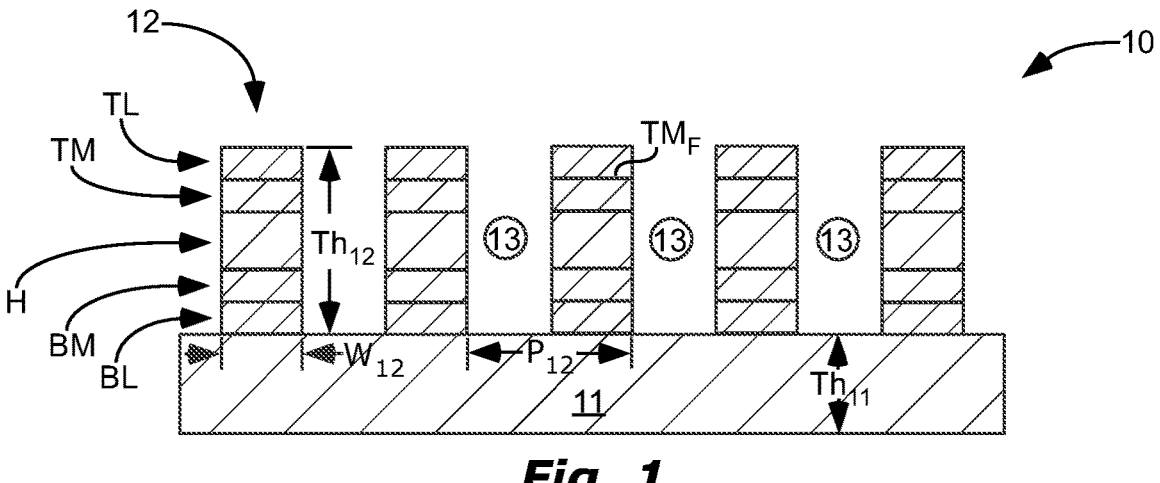

FIG. 1 is a cross-sectional side-view of a waveplate 10 with ribs 12 on a substrate 11. Each rib 12 can include the following layers in the following order moving outward from the substrate 11: a bottom-low-layer BL, a bottom-medium-layer BM, a high-layer H, a top-medium-layer TM, then a top-low-layer TL.

Figure 2:
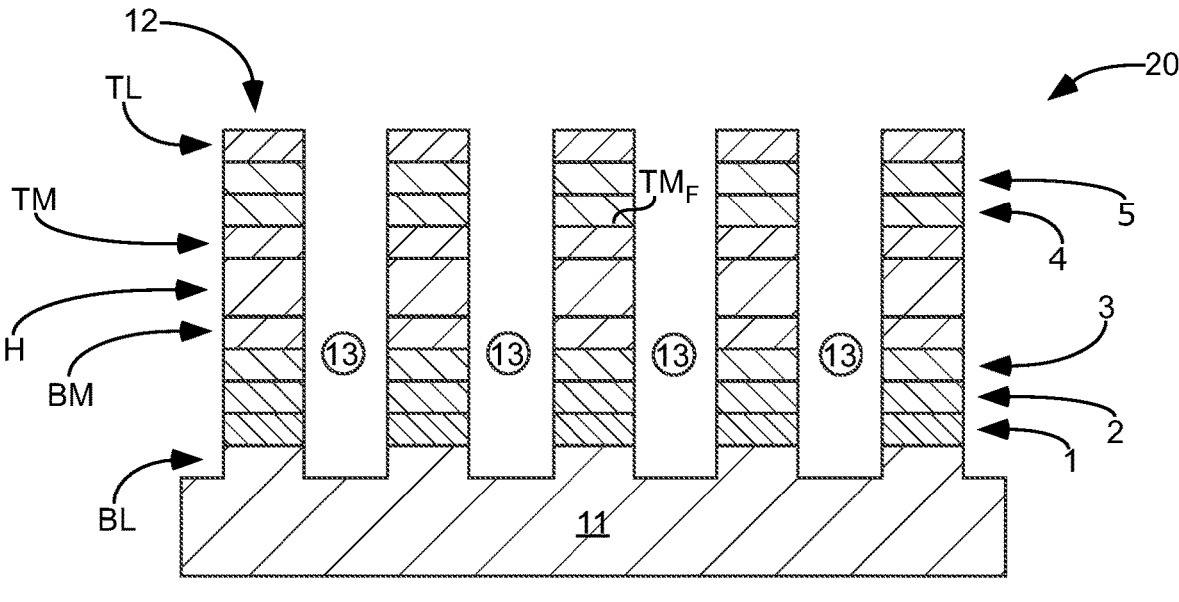

FIG. 2 is a cross-sectional side-view of a waveplate 20 with ribs 12 on a substrate 11. Each rib 12 can include the following layers in the following order moving outward from the substrate 11: a bottom-low-layer BL, a first-layer 1, a second-layer 2, a third-layer 3, a bottom-medium-layer BM, a high-layer H, a top-medium-layer TM, a fourth-layer 4, a fifth-layer 5, then a top-low-layer TL.

Figure 3:
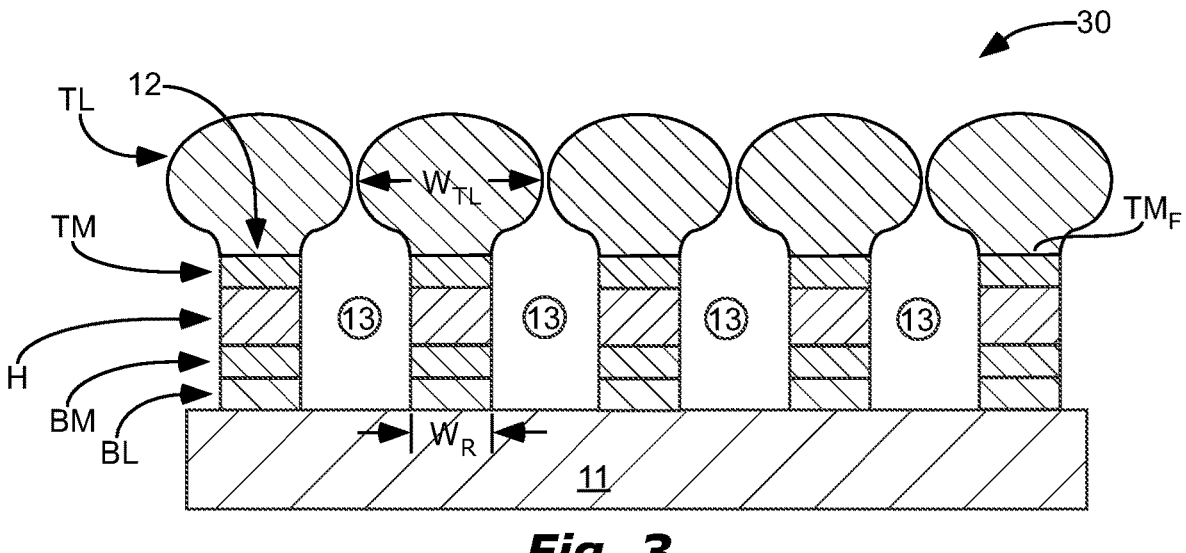

FIG. 3 is a cross-sectional side-view of a waveplate 30, similar to waveplates 10 and 20, except that in waveplate 30, the top-low-layer TL is a widest of the layers in each rib 12 ($W_{TL} > W_R$).

Figure 4:
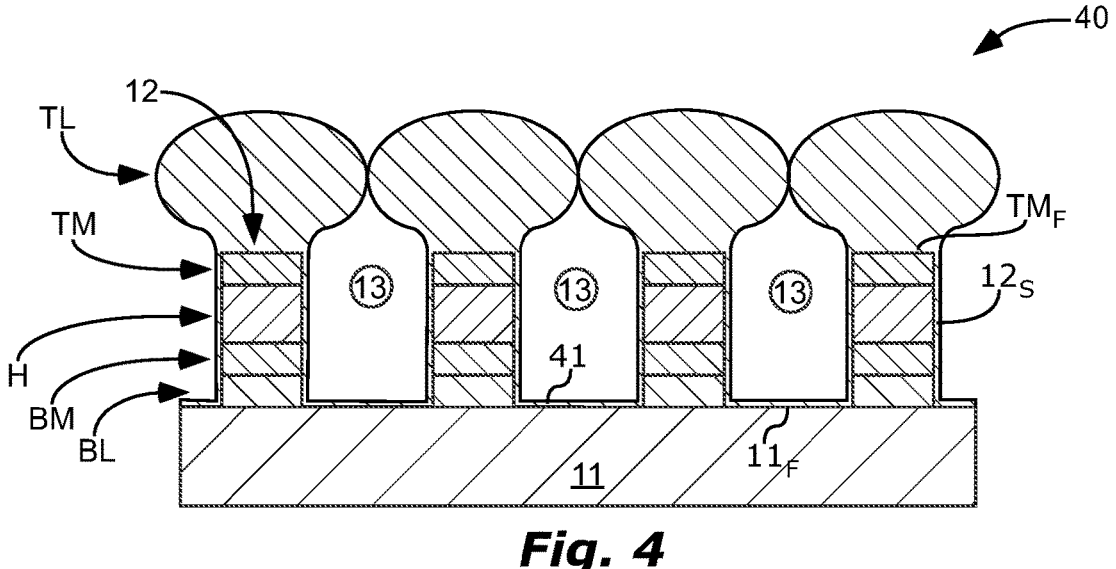

FIG. 4 is a cross-sectional side-view of a waveplate 40, similar to waveplates 10, 20, and 30, except that waveplate 40 further comprises (a) the top-low-layer TL of each rib 12 touches the top-low-layer TL of adjacent rib(s), and (b) the top-low-layer TL extends down into the channels 13 as a conformal coating 41, along sides $12_S$ of the ribs 12, and on a face $11_F$ of the substrate 11 in the channels 13. The channels 13 are filled with gas or vacuum.

Figure 5:
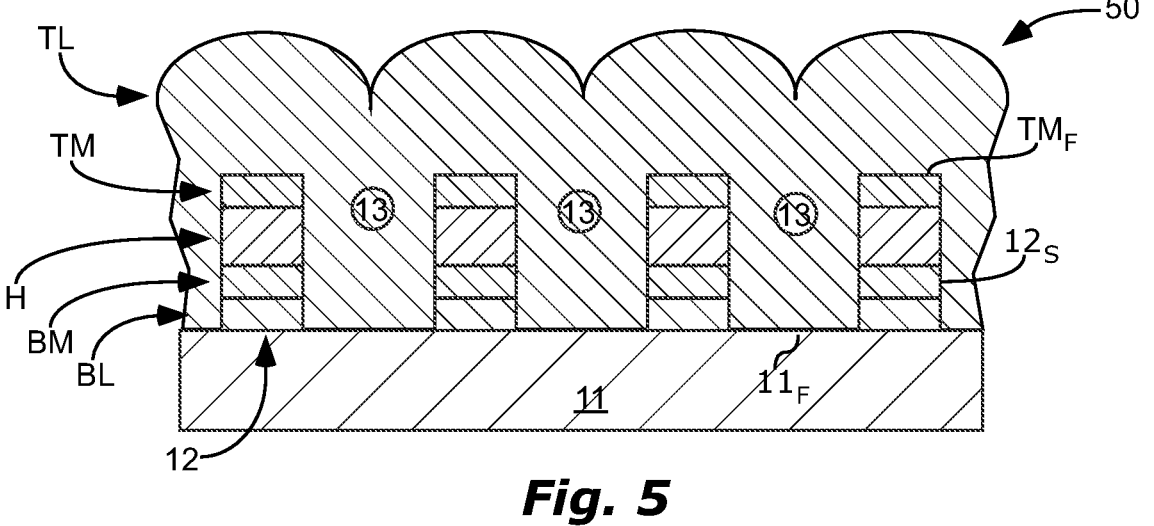

FIG. 5 is a cross-sectional side-view of a waveplate 50, similar to waveplates 10, 20, and 30, except that waveplate 50 further comprises the top-low-layer TL extending down into the channels 13, along sides $12_S$ of the ribs 12, and on a face $11_F$ of the substrate 11 in the channels 13, filling the channels 13.

Figure 6:
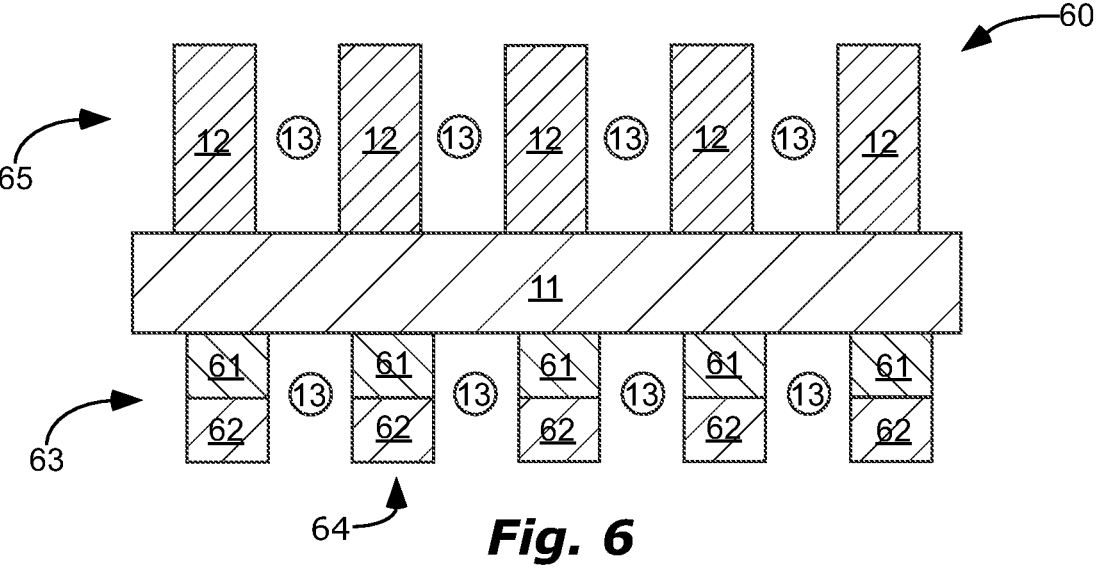

FIG. 6 is a cross-sectional side-view of an optical device 60, including a waveplate 65 on one side of a substrate 11 and a wire grid polarizer 63 on an opposite side of the substrate 11.

Figure 7:
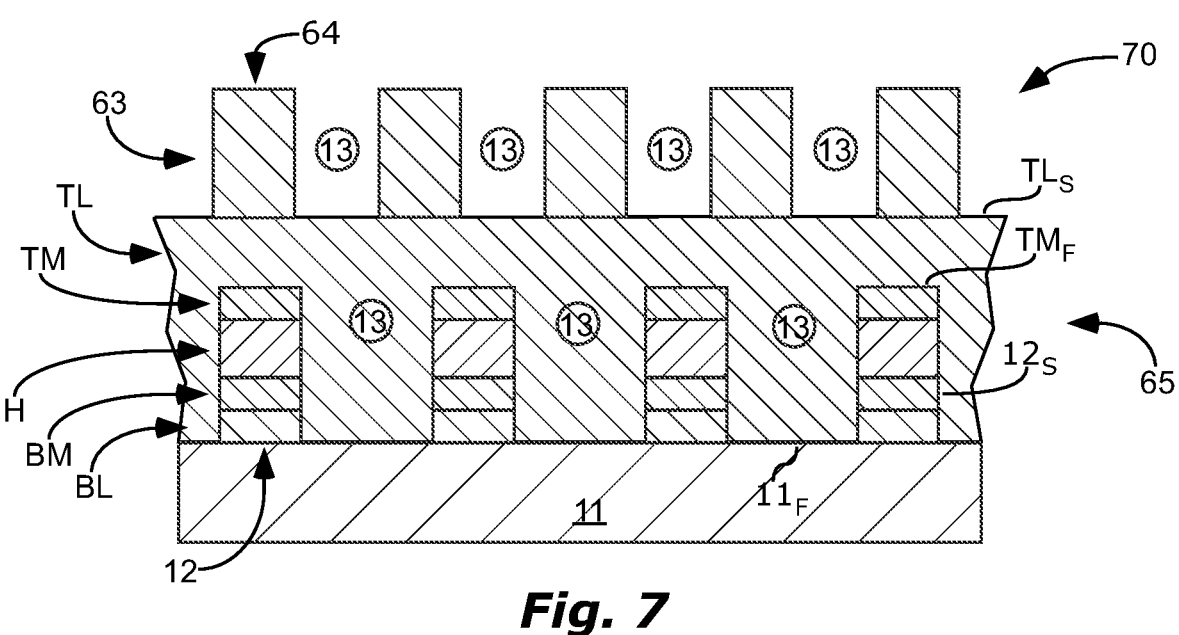

FIG. 7 is a cross-sectional side-view of an optical device 70 with a wire grid polarizer 63 on a waveplate 65.

Figure 8:
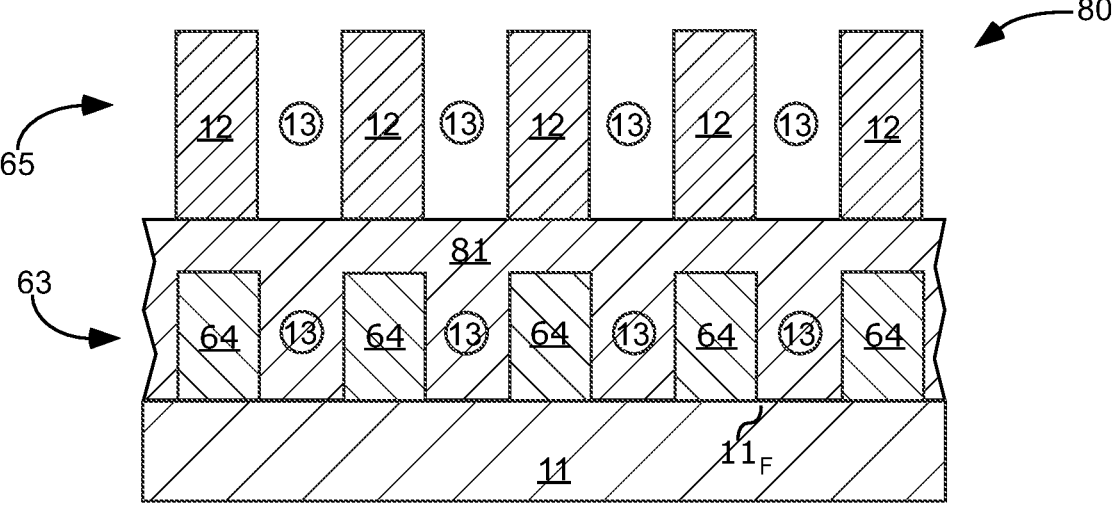

FIG. 8 is a cross-sectional side-view of an optical device 80 with a waveplate 65 on a wire grid polarizer 63.

DEFINITIONS

The following definitions, including plurals of the same, apply throughout this patent application.

As used herein, the term "elongated" means that rib length is substantially greater than rib width $W_{12}$ and rib thickness $Th_{12}$. Rib length is into the sheet of the figures and perpendicular to rib width $W_{12}$ or rib thickness $Th_{12}$). For example, rib length can be $\geq 10$ times, $\geq 100$ times, $\geq 1000$ times, or $\geq 10,000$ times larger than rib width $W_{12}$, wire thickness $Th_{12}$, or both. See FIG. 1.

As used herein, the phrase "fill the channels" (and other similar phrases) means completely fills, fills within normal manufacturing tolerances, or any deviation from completely fills would have negligible effect for ordinary use of the device.

As used herein, the phrase "identical material composition" (and other similar phrases, such as "same material composition") means exactly identical, identical within normal manufacturing tolerances, or nearly identical, such that any deviation from exactly identical would have negligible effect for ordinary use of the device.

As used herein, the term "refractive index" means the real part of the refractive index (n).

As used herein, the term "extinction coefficient" means the imaginary part of the refractive index (k).

Each real part of the index of refraction (n) and extinction coefficient (k) noted herein can be that value at 450 nm, 550 nm, 650 nm, across the ultraviolet spectrum, across the visible spectrum, across the infrared spectrum, or combinations thereof, as specified in the claims.

As used herein, the term "nm" means nanometer(s).

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "parallel" means exactly parallel, parallel within normal manufacturing tolerances, or nearly parallel, such that any deviation from exactly parallel would have negligible effect for ordinary use of the device.

As used herein, the term "substrate" means a base material, such as for example a glass wafer. Unless specified otherwise in the claims, the term "substrate" also includes any thin film(s) sandwiched between the glass wafer and the ribs 12 or wires 63. The substrate can provide structural support for the ribs or wires. The substrate can be thick in an optical sense, meaning substantially thicker than a maximum wavelength of light in the wavelength range of use. For example, a thickness $Th_{11}$ (FIG. 1) of the substrate can be $\geq 0.1$ mm, $\geq 0.35$ mm, or $\geq 0.6$ mm.

Unless explicitly noted otherwise herein, all n&k values (refractive index n and extinction coefficient k) are such values across a wavelength range from 400 nm through 700 nm.

Unless explicitly noted otherwise herein, all temperature-dependent values are such values at 25° C.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on reflectance R, the refractive index n, and the extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with $k \leq 0.1$ in the wavelength range are "transparent" materials, materials with $k > 0.1$ and $R \leq 0.6$ in the specified wavelength range are "absorptive" materials, and materials with $k > 0.1$ and $R > 0.6$ in the specified wavelength range are "reflective" materials. If explicitly so stated in the claims, materials with $k > 0.1$ and $R \geq 0.7$, $R \geq 0.8$, or $R \geq 0.9$, in the specified wavelength range, are "reflective" materials.

DETAILED DESCRIPTION

For an ideal quarter waveplate, retardation of the wave is ¼ of the wavelength. For an ideal half waveplate, retardation of the wave is ½ of the wavelength. It is useful for actual waveplates to have performance similar to that of ideal waveplates. Broadband waveplates, with ideal or near-ideal performance across a broad wavelength range, are desirable. Other useful waveplate characteristics include thin, ability to withstand high temperature, and broad range of incident angles. Manufacturing flexibility is also useful, allowing the waveplate to be combined with other optical components, such as polarizers. The present invention is directed to various waveplates that satisfy these needs. Each waveplate may satisfy one, some, or all of these needs.

As illustrated in FIGS. 1-8, waveplates 10, 20, 30, 40, 50 and 65 are shown comprising ribs 12 on a substrate 11 with channels 13 between adjacent ribs 12. The substrate 11 can be transparent and can have a refractive index $n_{11}$ and an extinction coefficient $k_{11}$.

Each rib 12 can include the following layers in the following order moving outward from the substrate 11: a bottom-medium-layer BM with a refractive index $n_{BM}$ and an extinction coefficient $k_{BM}$, a high-layer H with a refractive index $n_H$ and an extinction coefficient $k_H$, then a top-medium-layer TM with a refractive index $n_{TM}$ and an extinction coefficient $k_{TM}$. The bottom-medium-layer BM can adjoin the high-layer H. The top-medium-layer TM can adjoin the high-layer H.

Each channel 13 can separate the layers of each rib 12 from corresponding layer(s) in any adjacent rib 12 (i.e. separated by gas, vacuum, or solid material that is different from the solid material of the layer in the rib 12). As illustrated in FIGS. 1-5, each channel 13 can fully separate the bottom-medium-layer BM, the high-layer H, and the top-medium-layer TM of adjacent ribs 12. This separation can improve waveplate performance.

Each rib 12 can be located on a bottom-low-layer BL. The bottom-low-layer BL can have a refractive index $n_{BL}$ and an extinction coefficient $k_{BL}$. The bottom-medium-layer BM can adjoin the bottom-low-layer BL.

The bottom-low-layer BL can be integral with the substrate 11, and can have an identical material composition with the substrate 11 (see FIG. 2). Thus, the bottom-low-layer BL of waveplate 20 is not considered to be part of the ribs 11, because it is a continuous layer, spanning the channels 13 (with material of the substrate). In this case, the bottom-low-layer BL is an elongated rod-like protrusion extending from the substrate 11. Each rib 12 is located on, and aligned with, one of these protrusions of the bottom-low-layer.

Alternatively, as illustrated in FIGS. 1 and 3-5, each bottom-low-layer BL can be separate from the bottom-low-layer BL of adjacent ribs 12. Thus, the bottom-low-layer BL can be part of the ribs 12, and the bottom-low-layer BL can be a layer in the rib 12, between the bottom-medium-layer BM and the substrate. The bottom-low-layer BL can adjoin the substrate 11.

A bottom-low-layer BL that is integral with the substrate 11 (FIG. 2) or that is a layer in the rib 12 (FIGS. 1 and 3-5) can be combined with any other aspects of the invention herein.

A top-low-layer TL, with a refractive index $n_{TL}$ and an extinction coefficient $k_{TL}$, can be located on a face $TM_F$ of the top-medium-layer farthest from the substrate. The top-medium-layer TM can adjoin the top-low-layer TL.

The top-low-layer TL can be a layer of the ribs 12. Each top-low-layer TL can be separate from the top-low-layer TL of adjacent ribs 12 (see FIGS. 1-3). The top-low-layer TL can be an outermost layer of each rib 12. The top-low-layer TL can be a widest of the layers in each rib 12 (e.g. $W_{TL} > W_R$ in FIG. 3).

The top-low-layer TL can be formed by lithography and etching with the other layers of the ribs 12 (FIGS. 1-2). Forming the top-low-layer TL as a layer of the ribs 12 can improve waveplate performance. Alternatively, the top-low-layer TL can be applied by sputter or evaporation deposition after formation of the ribs 12 (FIG. 3).

In contrast, the top-low-layer TL of waveplates 40 and 50 is not part of the ribs 12 (see FIGS. 4-5). The top-low-layer TL of waveplates 40 and 50 spans the channels 13, forming a continuous layer over the ribs 12 and channels 13. The wider top-low-layer TL can be formed by sputter deposition. The top-low-layer TL of each rib 12 can be wide enough to touch the top-low-layer TL of any adjacent rib. Touching top-low-layers TL can provide protection to the ribs 12. The top-low-layer TL can be an outermost layer of the waveplate.

As illustrated in FIG. 4, each channel 13 can extend into and can partially separate the top-low-layers TL of adjacent ribs 12. Sputter deposition settings can be adjusted for such partial separation. As illustrated in FIG. 5, material of the top-low-layers TL can fill the channels 13.

The top-low-layer TL as a layer of the ribs 12 (FIGS. 1-3) or the top-low-layer TL spanning the channels 13 (FIGS. 4-5) can be combined with any other aspects of the invention herein.

All materials of the waveplates 10, 20, 30, 40, 50, and 65 can be transparent. One or more of the extinction coefficients $k_{BL}$, $k_{BM}$, $k_H$, $k_{TM}$, $k_{TL}$, and $k_{11}$ can be $\leq 0.1$, $\leq 0.03$, or $\leq 0.001$.

One, some, or all of the following relationships can improve waveplate 10 performance: $n_{BL} < n_{BM} < n_H$, $n_{TL} < n_{TM} < n_H$, $n_{BL} = n_{TL}$, $n_{BM} = n_{TM}$, $n_{11} < n_{BM}$, $n_{11} < n_{TM}$. The bottom-low-layer BL and the top-low-layer TL can have the same material composition with respect to each other. The bottom-medium-layer BM and the top-medium-layer TM can have the same material composition with respect to each other.

Each rib 12 in waveplate 20 can further comprise a first-layer 1 with a refractive index $n_1$ and an extinction coefficient $k_1$, a second-layer 2 with a refractive index $n_2$ and an extinction coefficient $k_2$, a third-layer 3 with a refractive index $n_3$ and an extinction coefficient $k_3$, a fourth-layer 4 with a refractive index $n_4$ and an extinction coefficient $k_4$, and a fifth-layer 5 with a refractive index $n_5$ and an extinction coefficient $k_5$.

An order of the layers in each rib 12 in waveplate 20, moving outward from the substrate, can be the first-layer 1, the second-layer 2, the third-layer 3, the bottom-medium-layer BM, the high-layer H, the top-medium-layer TM, the fourth-layer 4, then the fifth-layer 5. The first-layer 1 can be located on the bottom-low-layer BL, and can be sandwiched between the second-layer 2 and bottom-low-layer BL. The top-low-layer TL can be located on the fifth-layer 5, and farther from the substrate than the fifth-layer 5.

One, some, or all of the following relationships of the refractive indices of the layers can improve waveplate 20 performance: $n_{BL}<n_1<n_{BM}$, $n_{BL}<n_3<n_{BM}$, $n_1<n_2<n_H$, $n_3<n_2$, $n_{TL}<n_4<n_{TM}$, $n_4<n_5<n_H$, $n_1=n_3=n_4$, $n_2=n_{BM}=n_{TM}=n_5$. One or more of the extinction coefficients $k_1$, $k_2$, $k_3$, $k_4$, and $k_5$ can be $\leq 0.1$, $\leq 0.01$, or $\leq 0.001$.

The first-layer 1, the third-layer 3, and the fourth-layer 4 can have an identical material composition. The second-layer 2, the bottom-medium-layer BM, the top-medium-layer TM, and the fifth-layer 5 can have an identical material composition.

The added layers of waveplate 20 can be used in other waveplates described herein. Waveplate 20 can have broadband performance compared to waveplates with fewer layers (e.g. waveplate 10 in FIG. 1). But waveplate 20 can be more expensive to make than waveplate 10, due to added layers in waveplate 20.

FIG. 4 is a cross-sectional side-view of a waveplate 40, similar to waveplates 10, 20, and 30, except that waveplate 40 further comprises the top-low-layer TL extending down into the channels 13 as a conformal coating 41, along sides 12$_S$ of the ribs 12, and on a face 11$_F$ of the substrate 11 in the channels 13, but leaving the channels 13 filled with gas or vacuum. The conformal coating 41 can be formed by atomic layer deposition, then the wider top-low-layer TL at the top of the ribs 12 can be formed by sputter deposition. Alternatively, some remnant of the sputter deposition process can form this conformal coating 41. The conformal coating 41 can provide protection for sides 12$_S$ of the ribs 12.

FIG. 5 is a cross-sectional side-view of a waveplate 50, similar to waveplates 10, 20, and 30, except that waveplate 50 further comprises the top-low-layer TL extending down into the channels 13, along sides 12$_S$ of the ribs 12, and on a face 11$_F$ of the substrate 11 in the channels 13, filling the channels 13. Waveplate 50 can provide better rib 12 protection than waveplate 40. But performance of waveplate 50 can be worse than waveplate 40.

The top-low-layer TL of each rib 12 of waveplates 40 and 50 touch the top-low-layer TL of adjacent rib(s). A touching top-low-layer TL can improve protection of the ribs.

FIGS. 6-8 are cross-sectional side-views of optical devices 60, 70, and 80 with a waveplate 65 and a wire grid polarizer 63. The wire grid polarizer 63 can include an array of wires 64. Manufacturing the waveplate 65 and the wire grid polarizer 63 as a single component can reduce manufacturing cost. The waveplates 65 can be any example waveplate herein.

A longitudinal direction of the ribs 12 and the wires 64 can be parallel, perpendicular, or other angular relationship with respect to each other. For a circular polarizer, there can be a 45 degree angle difference between the longitudinal direction of the ribs 12 and the longitudinal direction of the wires 64.

Each wire 64 can including a reflective-wire 62 and an absorptive-wire 61. The absorptive-wire 61 can be sandwiched between the reflective-wire 62 and the substrate 11. The reflective-wire 62 and an absorptive-wire 61 are illustrated in FIG. 6, but may also be applied to the examples of FIGS. 7-8.

As illustrated in FIG. 6, the waveplate 65 and the wire grid polarizer 63 can be on opposite sides of the substrate 11 with respect to each other.

As illustrated in FIG. 7, the wire grid polarizer 63 can be on the waveplate 65, on the same side of the substrate 11 as the waveplate 65, and farther from the substrate 11 than the waveplate 65. The top-low-layer TL can be a continuous layer. The wire grid polarizer 63 can be located on a surface TL$_S$ of the top-low-layer TL farthest from the substrate 11. The surface TL$_S$ of the top-low-layer TL can be polished to form a smooth surface for applying the wires 64 of the wire grid polarizer 63.

As illustrated in FIG. 8, the waveplate 65 can be on the wire grid polarizer 63, on the same side of the substrate 11 as the wire grid polarizer 63, and farther from the substrate 11 than the wire grid polarizer 63. A solid fill material 81 can fill channels 13 between wires 64 of the wire grid polarizer 63 and can coat a far end of the wires 64. For example, the solid fill material 81 can be silicon dioxide or other transparent material. The solid fill material 81 can be applied as a solgel, by a spin-on-glass method, by chemical vapor deposition, or by atomic layer deposition.

All components of the waveplates herein can be dielectric. The ribs 12 of the waveplates herein can be elongated, and can be parallel with respect to each other.

Details of example waveplates are listed in Table 1. Column numbers are listed in the first row of Table 1. All thicknesses are in nanometers. Column 1 lists the reference character for possible layers of each example. If no material and thickness are listed for a particular layer, then such layer is not included in that example.

Columns 2-3 provide thicknesses and materials, respectively, for each layer of a broadband waveplate with niobium oxide as the high-layer H. Columns 4-5 provide thicknesses and materials, respectively, for each layer of a broadband waveplate with tantalum oxide as the high-layer H. Columns 6-7 provide thicknesses and materials, respectively, for each layer of a narrowband waveplate for red light. Columns 8-9 provide thicknesses and materials, respectively, for each layer of a narrowband waveplate for green light. Columns 10-11 provide thicknesses and materials, respectively, for each layer of a narrowband waveplate for blue light.

TABLE 1

| 1 | 2 | 3 | 4 | 5 | 6 | 7 | 8 | 9 | 10 | 11 |
|---|---|---|---|---|---|---|---|---|---|---|
| | Broadband ($Nb_2O_5$) | | Broadband ($Ta_2O_5$) | | Narrowband Red | | Narrowband Green | | Narrowband Blue | |
| | Th | Mat. | Th | Mat. | Th | Mat. | Th | Mat. | Th | Mat. |
| TL | 245 | $SiO_2$ | 272 | $SiO_2$ | 354 | $SiO_2$ | 289 | $SiO_2$ | 245 | $SiO_2$ |
| 5 | 20 | $HfO_2$ | 33 | $HfO_2$ | | | | | | |
| 4 | 33 | $GeO_2$ | 42 | $GeO_2$ | | | | | | |
| TM | 62 | $HfO_2$ | 164 | $HfO_2$ | 136 | $HfO_2$ | 91 | $HfO_2$ | 139 | $HfO_2$ |
| H | 239 | $Nb_2O_5$ | 58 | $Ta_2O_5$ | 359 | $Nb_2O_5$ | 284 | $Nb_2O_5$ | 94 | $Nb_2O_5$ |
| BM | 77 | $HfO_2$ | 181 | $HfO_2$ | 116 | $HfO_2$ | 62 | $HfO_2$ | 208 | $HfO_2$ |
| 3 | 30 | $GeO_2$ | 35 | $GeO_2$ | | | | | | |
| 2 | 13 | $HfO_2$ | 34 | $HfO_2$ | | | | | | |
| 1 | 91 | $GeO_2$ | 94 | $GeO_2$ | | | | | | |
| BL | 67 | $SiO_2$ | 40 | $SiO_2$ | 18 | $SiO_2$ | 190 | $SiO_2$ | 34 | $SiO_2$ |

In all example waveplates of Table 1, the bottom-low-layer BL and the top-low-layer TL are not part of the ribs 12. The bottom-low-layer BL is an elongated rod-like protrusion extending from the substrate 11, is integral with the substrate 11, and is made of the same material as the substrate (see FIG. 2). The top-low-layer TL is similar to waveplate 40, and forms a continuous layer over the ribs 12 and channels 13. The channels are air filled, and each channel 13 partially separates the top-low-layers TL of adjacent ribs 12.

The waveplates described herein, and the wire grid polarizers 63, can be formed by deposition of thin-films, lithography, and etch. Some of the thin-films, particularly the top-low-layer TL, can be formed by sputter deposition. The ribs 12, the wires 64, or both can be formed by imprinting these structures in a sol gel, then curing the sol gel.

What is claimed is:

1. A waveplate comprising:

ribs on a substrate with channels between adjacent ribs;

each rib located on a bottom-low-layer with a refractive index $n_{BL}$ and an extinction coefficients $k_{BL}$;

each rib comprises multiple layers, including a bottom-medium-layer with a refractive index $n_{BM}$ and an extinction coefficients $k_{BM}$, a high-layer with a refractive index $n_H$ and an extinction coefficients $k_H$, and a top-medium-layer with a refractive index $n_{TM}$ and an extinction coefficients $k_{TM}$;

each layer of each rib being separate from a corresponding layer in any adjacent rib;

moving outward from the substrate, an order of the multiple layers in each rib is the bottom-medium-layer, the high-layer, then the top-medium-layer;

a top-low-layer, with a refractive index $n_{TL}$ and an extinction coefficients $k_{TL}$, on a face of the top-medium-layer farthest from the substrate;

each refractive index and extinction coefficient is measured at 550 nm;

$k_{BL}$, $k_{BM}$, $k_H$, $k_{TM}$, and $k_{TL}$ are all≤0.1;

$n_{BL} < n_{BM} < n_H$; and $n_{TL} < n_{TM} < n_H$.

2. The waveplate of claim 1, wherein the substrate has a refractive index nu and an extinction coefficients $k_{11}$, $n_{11} < n_{BM}$, $n_{11} < n_{TM}$, and $k_{TL} ≤ 0.1$.

3. The waveplate of claim 1, wherein the top-low-layer is a layer of the ribs.

4. The waveplate of claim 3, wherein the top-low-layer is a widest of the layers in each rib.

5. The waveplate of claim 1, wherein the top-low-layer spans the channels, forming a continuous layer over the ribs and channels.

6. The waveplate of claim 5, wherein:

each channel fully separates the bottom-low-layers, the bottom-medium-layers, the high-layer, and the top-medium-layers of adjacent ribs; and each channel partially separates the top-low-layers of adjacent ribs.

7. The waveplate of claim 1, wherein the top-low-layer extends down into the channels as a conformal coating, along sides of the ribs, and on a face of the substrate in the channels, but leaving the channels filled with gas or vacuum.

8. The waveplate of claim 1, wherein the top-low-layer extends down into the channels, along sides of the ribs, and on a face of the substrate in the channels, filling the channels.

9. An optical device including the waveplate of claim 1, the optical device further comprising a wire grid polarizer, wherein:

the wire grid polarizer is located on the ribs and farther from the substrate than the ribs; or the ribs are located on the wire grid polarizer and farther from the substrate than the wire grid polarizer.

10. An optical device including the waveplate of claim 1, the optical device further comprising a wire grid polarizer on an opposite side of the substrate from the ribs.

11. The optical device of claim 10, wherein:

the wire grid polarizer comprises an array of wires, each wire including a reflective-wire and an absorptive-wire; and the absorptive-wire is sandwiched between the reflective-wire and the substrate.

12. The waveplate of claim 1, wherein $n_{BL} = n_{TL}$ and $n_{BM} = n_{TM}$.

13. The waveplate of claim 1, wherein:

the bottom-low-layer and the top-low-layer have an identical material composition; and the bottom-medium-layer and the top-medium-layer have an identical material composition.

14. The waveplate of claim 1, wherein the bottom-low-layer is integral with the substrate, and has an identical material composition with the substrate.

15. The waveplate of claim 1, wherein the bottom-low-layer is made of a different material than the substrate, and the bottom-low-layer is a layer in the ribs.

16. The waveplate of claim 15, wherein the bottom-low-layer adjoins the substrate.

17. The waveplate of claim 1, wherein all components of the waveplate are dielectric.

18. The waveplate of claim 1, wherein the ribs are elongated, and the ribs are parallel with respect to each other.

19. The waveplate of claim 1, wherein the top-low-layer is an outermost layer of the rib.

20. The waveplate of claim 1, wherein:

each rib further comprises the following layers: a first-layer with a refractive index $n_1$ and an extinction coefficient $k_1$, a second-layer with a refractive index $n_2$ and an extinction coefficient $k_2$, a third-layer with a refractive index $n_3$ and an extinction coefficient $k_3$, a fourth-layer with a refractive index $n_4$ and an extinction coefficient $k_4$, and a fifth-layer with a refractive index $n_5$ and an extinction coefficient $k_5$; and moving outward from the substrate, the order of the multiple layers in each rib is the first-layer, the second-layer, the third-layer, the bottom-medium-layer, the high-layer, the top-medium-layer, the fourth-layer, then the fifth-layer;

$k_1$, $k_2$, $k_3$, $k_4$, and $k_5$ are all $\leq 0.1$; and $n_{BL} < n_1 < n_{BM}$, $n_{BL} < n_3 < n_{BM}$, $n_1 < n_2 < n_H$, $n_3 < n_2$, $n_{TL} < n_4 < n_{TM}$, and $n_4 < n_5 < n_H$.

* * * * *